(12) United States Patent
Paternó

(10) Patent No.: US 11,044,925 B2
(45) Date of Patent: Jun. 29, 2021

(54) PROCEDURE FOR THE PRODUCTION OF A MULTIPLIER AND MODULATOR ADDITIVE OF THE RUMINAL MICROBIOTE

(71) Applicant: BIOPREMIX TECHNOLOGIES LLC, Wilmington, DE (US)

(72) Inventor: Marcelo Alejandro Paternó, Provincia de Córdoba (AR)

(73) Assignee: BIOPREMIX TECHNOLOGIES LLC, Wilmington, DE (US)

( * ) Notice: Subject to any disclaimer, the term of this patent is extended or adjusted under 35 U.S.C. 154(b) by 108 days.

(21) Appl. No.: 16/128,009

(22) Filed: Sep. 11, 2018

(65) Prior Publication Data
US 2019/0150477 A1  May 23, 2019

(30) Foreign Application Priority Data
Nov. 23, 2017 (UY) .......................................... 37492

(51) Int. Cl.
| | | |
|---|---|---|
| *A23K 10/18* | (2016.01) | |
| *A23K 50/10* | (2016.01) | |
| *A23K 10/00* | (2016.01) | |
| *A23K 10/12* | (2016.01) | |
| *A23K 10/10* | (2016.01) | |
| *G06N 20/00* | (2019.01) | |
| *G06N 7/02* | (2006.01) | |

(52) U.S. Cl.
CPC .............. *A23K 10/18* (2016.05); *A23K 10/00* (2016.05); *A23K 10/10* (2016.05); *A23K 10/12* (2016.05); *A23K 50/10* (2016.05); *G06N 7/02* (2013.01); *G06N 20/00* (2019.01)

(58) Field of Classification Search
CPC ................................. A23K 10/18; A23K 50/10
See application file for complete search history.

*Primary Examiner* — Taeyoon Kim
*Assistant Examiner* — Tiffany M Gough
(74) *Attorney, Agent, or Firm* — Donald J. Ranft; Collen

(57) ABSTRACT

The present invention discloses a multiplier and modulator additive of the ruminal microbiota created from exogenous multienzyme compounds, integrating processes and devices for cultivating and harvesting biomass of selected fungal species, assembling active components of fungal origin and by mixing supplies according to specifications, forming thus a multiplier and modulator additive of the ruminal microbiota suitable for its application (as part of food or via distribution devices as a nutritional supplement) in the ruminant animal feed industry.

10 Claims, 3 Drawing Sheets

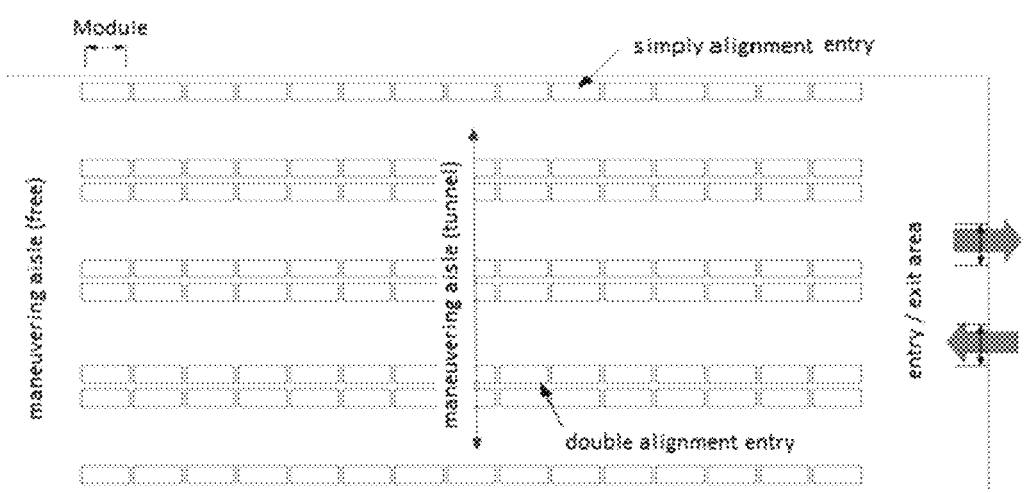

PROCEDURE FOR THE PRODUCTION OF A MULTIPLIER AND MODULATOR ADDITIVE OF THE RUMINAL MICROBIOTE

CROSS REFERENCE TO RELATED APPLICATION

This is a national application which claims priority on Uruguayan Patent Application No. 37492, filed on Nov. 22, 2017, which priority claim is repeated here.

FIELD OF THE INVENTION

The present invention relates to the field of feeding of ruminant animals, more specifically refers to a multiplier and modulator additive of the ruminal microbiota created from exogenous multienzyme compounds, integrating processes and devices to cultivate and harvest biomass of selected fungal species, assemble active components of fungal origin and by mixing of supplies according to specifications, thus forming a multiplier and modulator additive of the ruminal microbiota suitable for its application (as part of food or via distribution devices as a nutritional supplement) in the ruminant animal feed industry.

BACKGROUND

Ruminant animals, more commonly called polygastric (cattle, goats, sheep, camelids, cervids, etc.) have the ability to digest cellulose and hemicellulose and certain lignified components of terrestrial vegetable biomass, pastures, natural pastures, implanted, leaves, plant residues in general, lignocellulosic waste and its derivatives, etc., that monogastric species (canines, pigs, birds, rabbits, etc.) are not capable of doing so. Therefore, ruminants produce high quality proteins such as milk and meat, from these compounds present in the above-mentioned biomass.

The problem to solve is the significant and sustainable increase in the production of meat and milk worldwide, and its consequent increase in costs when the feeds destined to feed animals are additivated with high-cost raw materials, which leads, in the majority of cases, in anti-economic productive equations. Consequently, studies have shown that the use in different feeding systems for animals of forages with high fiber content and lignocellulosic residues combined with the application of the multiplier additive of the present invention, allow to achieve a saving of almost 40% of the costs of food, transforming productive activities of meat and milk that otherwise would be unfeasible, to productive schemes highly profitable and much more friendly to the environment and of much lower environmental impact.

A large amount of evolutionary details explain the accumulated differences in almost 20 million years of co-adaptation of the host animal (the ruminant) with microorganism species that are part of the microbial flora or microbiome contained in the rumen that nourishes it, where these species link through one of the many "commensalisms" that make up the vast microbiological diversity that exists in nature. The present invention focuses on a method for consistently producing a nutritional additive with the ability to develop a "functional shortcut" in the link between these species, multiplying the effectiveness of the microbiome to degrade the fibrous fraction of the feed supplied to the animal, and modulate the balance between the components with prebiotic and probiotic effect that are included in these foods.

There is ample information on the application of additives in the nutrition of ruminants, trying to improve the conversion and use of different types of nutrients and reduce problems associated with the use of biomass of low nutritional value, such as those indicated in the following publications:

Aasha ReKha, Rama Prasad and Ramona: *Evaluations of Groundnut Haulms supplemented whit yeast culture* (INDIAN JOURNAL OF ANIMAL NUTRITION 22-3).

Balci F., Dikmen, Orman, Turkmen 2007: *The Effect of fibrolytic exogenous enzyme on fattening performance of steers* (BULGARIAN JOURNAL VETERINARY MEDICINE).

Colombato D. Mould F L, Bhat, Morgavi and Owen 2003—*Influence of fibrolytic enzymes on the hydrolysis and fermentations of pure cellulose and xylan by mixed ruminal microorganisms in vitro.* JOURNAL OF ANIMAL SCIENCE 81: 1040-1050

The ruminal microbiota multiplier and modulator additive from exogenous multienzyme compounds of the present invention, has the ability to increase the degradation of cellulose, hemicellulose and certain lignified components of the animal diet, achieving an increase in milk and meat productivity of polygastric ruminant species, by a direct incremental in the efficiency of metabolization of celluloses, hemicelluloses and lignins. It is not a technology applicable to other species such as monogastric ones.

The biometric analysis performed, have generated positive results that confirm the significant weight increase and milk production in ruminant animals, under different production conditions. There is also a significant increase in all productive figures, such as improvement of bodily states in herds and breeding herds, weight at weaning, pregnancy rates and other measurable productive patterns in different applications, both in breeding herds and multiple-species intensive feedings.

The ruminal microbiota multiplier and modulator additive from exogenous multienzyme compounds of the present invention allows higher amounts of fiber to be used in confinement or open field production systems with and without supplementation of balanced or conventional grains. For years it has been observed that there is abundant fermentable organic matter in animal manure, which shows the inefficiency in ruminal processes in the presence of semi-intensive or intensive systems existing using high contents of concentrates.

By means of the additive of the present invention, a solution is provided that increases the efficiency of the use of fibrous forages, or of cellulosic residues, which increases the productivity of meat or milk without the addition of cereals and of high-cost vegetable origin proteins that compete with human consumption directly, allowing the reduction of food costs.

In addition, the increasing demand of food for human consumption is growing sharply (increased production of pigs, poultry for meat, poultry for eggs), production of corn starch and sugar derivatives for manufacture of additives for direct human consumption, is also increasing, to which we also have to add the manufacture of bio-ethanol from human consumption corn.

The multiplier and modulator of the ruminal microbiota additive from exogenous multienzyme compounds of the present invention, represents a sustainable technology, allowing the polygastric ruminant animals not to compete with human beings for the use of cereals and soybean derivatives, which contributes to a lower contamination of the environment, estimating a significant reduction in the emission of enteric methane to the atmosphere (−28%).

The use of the additive herein described applied to industrial feed lots, reduces the use of corn (or starches in general) and proteins of vegetable origin to less than half, increasing fiber levels, achieving the same results, and producing a 70% less impact on the environment, said additive increases the efficiency of the use of cellulose compounds (forages, cellulose discards etc.) increasing the microbial yield rate of the rumen. Already in the first tests and comparative tests, it was observed in the laboratory (in-vitro measurements), as well as in applied field research (in-vivo measurements), with fistulated animals, an improvement in the rate of digestion and increase in productivity.

The microbial yield rate increased 5.33 times compared to the control, this is because in measurements made on cellulosic substrate, with the addition of the additive of the present invention to the same control diet, it was found that the flow rate of glucose and sucrose was 5.33 times more than the control in the same time of degradation. This was achieved with higher microbial performance than with the control diet.

Table 1 shows the difference between Normal Microbial Performance (NMY) vs NMY added to the effect of the additive object of the present invention, considering its differential digestion rate without the addition of starches or proteins to the diet.

95% of the ruminal microbiome associated with Normal Microbial Yield (NMY) is composed of bacteria that attack, degrade and hydrolyze cellulose, hemicellulose and a fraction of lignified compounds. In a natural state, this bacterial population has an efficiency of degradation of the feed supplied to the animal that does not exceed 40% of average utilization, with a maximum performance close to 45%.

As a consequence, using the additive of the present invention, it is possible to go from a performance of the aforementioned 45% efficiency to values close to 88%. The remaining 5% of this ruminal universe is constituted by a fungal population of 4% and 1% of protozoa.

The process of the present invention includes the production of a multienzyme active component of fungal origin (hereinafter referred to as Active Component 1: A.C. 1) as part of the formulation process of the multiplicator and modulator of the ruminal microbiota additive. The modulation of the digestion process of cellulose residues or forages with high fibrous content is a fundamental step for the operation of said additive, since without the incorporation of a defined mix of supplies with modulating effect (hereinafter referred to as Active Component 2: A.C. 2) the equilibrium point sought in the processing of cellulosomatic activities within the reticulum-ruminal digestive complex is not reached.

Therefore, it is necessary to incorporate in the formulation of the additive the modulating supplies contained in A.C. 1, to nourish in a special way the ruminal microbiome and confer a faster reproduction rate, which allows to increase the range of ruminal efficiency values until achieving a digestion rate 560% higher than the value obtained through the consumption of forages or rations without additivation.

The modulating activity of supplies to be mixed (such as yeast, vitamins, minerals, amino acids, mono-oligosaccharides) in the proportions defined within A.C. 1 potentiates the catalytic effects associated with A.C. 1 (which is obtained by the industrial application of the process object of this patent), achieving that the present additive increases the digestibility of low quality biomass for animal feed.

BRIEF DESCRIPTION OF THE INVENTION

Through the implementation of the procedure object of this patent (production of a multiplier and modulator additive of the ruminal microbiota from exogenous multienzyme compounds), selected species of fungi (associated with the degradation of cellulose in wood, discards and cellulose residues or simply forages in different phenological stages of growth) are multiplied, managing to produce in a sustained form biomass of fungal origin containing exo-enzymes to supplement the rumen with compounds that enhance the rumen's microbiota in terms of its ability to form multienzyme complexes associated with the fibrous fraction of the food called cellulosomes or cohesion domains between the microbial populations present in the rumen and the active components contained in the additive object of the present invention.

FIG. 1 depicts the Structure of the cellulosome. The source for FIG. 1 is Montoya et al, Acta biol. Colomb., Vol. 12S, 2007, 55-74. Structural and catalytic components, simultaneously linked to a cell of the microorganism that produces it and to the cellulosic substrate; functional domains: SLH, homology with the S layer; CH I and CH II, cohesin I and II; DK I and DK II, Dockerin I and II; CBM, cellulose binding module; GH, glycosyl hydrolase.

The selected species of fungi, which are recombined in a different proportion by means of the production process of the additive, are cultivated separately in growing rooms and it is from the product of the fructification induced on cellulose substrates—by the conditions defined in current specification.—that Active Component 1 of this additive is obtained, which is later added yeast culture, vitamins, minerals, essential amino acids and other excipients in defined proportions (Active Component 2) to obtain the final product (ruminal microbiota modulator additive), achieving a balance in the natural microbial nutrition of the rumen.

To determine the optimal population proportion between the ruminal bacterial flora and the composition of the multiplier and modulator additive of the present invention, numerous assays were performed using both in-vitro and field studies. Considering an average bacterial size of 2-5 um versus 10-15 um of a spore or conidial residue of a fungus, we rely on this premise to keep a proportion in terms of the scale of the catalytic domains, cohesion sites and population distribution. Based on this premise, by experimental methods the effectiveness of the indicated proportion was verified.

After several tests we have determined that the recommended proportion of associated components in the ruminal cohesion domains is 1 part of the multiplier and modulator additive with 10 parts of bacterial microbiota existing in the rumen. Under this conditions, using as indicator an analysis of manure, a reduction in the amount of residual fermentable organic matter was verified (up to −30% of organic matter), which indicates a greater digestion, greater use of cellulose, and therefore more production.

In summary, the advantages of the additive produced according to the process object of the present invention are:

a) Reduction of costs in the nutrition of ruminants obtained as a result of the addition of the multiplier and modulator additive of the present invention, with various benefits related with the reduction of costs from the following premises:

The use of cellulosic biomass of low economic value, not usable by other species for the production of meat and milk.

The use of these cellulosic biomasses for the multiplier and modulator additive to promote the balance of the ruminal microbiota with capacity for saccharification of the cellulose, hemicellulose and lignified compounds.

Generation of energy highly available for rumen bacteria to manufacture microbial protein.

The aforementioned points reflect that the additive allows increasing the proportion of less expensive raw materials (biomass fractions rich in fibers), in order to avoid the use of concentrates such as corn and soybeans, further lowering the manufacturing costs.

FIG. 2 (Fiber/concentrate ratio (viable range) in diet and cost) shows that as the levels of concentrates decrease and fiber levels increase, production costs decrease. In this way it is possible to reduce costs per kilogram of milk or meat produced with a certain amount of food.

b) Green and environmental friendly technology:

The cohesion domains (or complexes) that are formed through the interaction of the multiplier and modulator additive of the present invention and the ruminal microbiota, make that the final products in the rumen, after the degradation of the lignocellulosic compounds, being glucose and sucrose, instead of cellobiose, thus producing the saccharification of indigestible compounds under natural conditions and achieving lower release of enteric methane into the atmosphere (values of reduction in energy loss measured as methane is close to −28%, with respect to the consumption of fibrous foods without incorporating the additive), with the consequent favorable mitigation of air pollution.

Table 2 shows the differential calculation of the estimated production of methane (CH4) by contrast between the consumption of diets with high concentrate vs. high fiber vs. high fiber+additive of the present invention (produced by mixing the Active Components 1 and 2, in the proportions indicated in the formulation protocol described as step 6 of the production process of the multiplier and modulator additive of the ruminal microbiota). Following a quadratic regression model, the following components were related through the expression:

$$Y = 1.62 \times 1 - 0.38 \times 2 + 3.78 \times 3 + 1.49 \times 4 + 1142$$

As shown in Table 2, there is a significant reduction in the loss of energy as methane (estimated as Y) when the consumption of fibrous foods replaces a part of the consumption of concentrated food, but the reduction associated with the use of the additive in this type of diets is even higher, reaching −49% with respect to the estimated values for diets with a high proportion of concentrated foods that do not use the additive: this demonstrates the industrial usefulness of the additive for both high and low proportion of concentrated foods.

Beyond facilitating the use of the fibrous fraction of biomass composed mainly of cellulose and hemicellulose, it has been found that the incorporation of the multiplier and modulator additive of the present invention allows the use of a greater proportion of byproducts with high lignocellulosic content (such as peanut husk and wood chips) with encouraging productive results, making it possible to extend the borders of livestock to marginal areas for ruminants. Therefore, zones or regions throughout the world that were unproductive until today, could increase their receptivity and productivity, incorporating the use of the additive of the present invention as part of different systems of preparation and distribution of fibrous foods for ruminant animals.

BRIEF DESCRIPTION OF THE DRAWINGS

FIG. 3 depicts a distribution of trays in the culture room.

BRIEF DESCRIPTION OF THE TABLES

Figure 1:
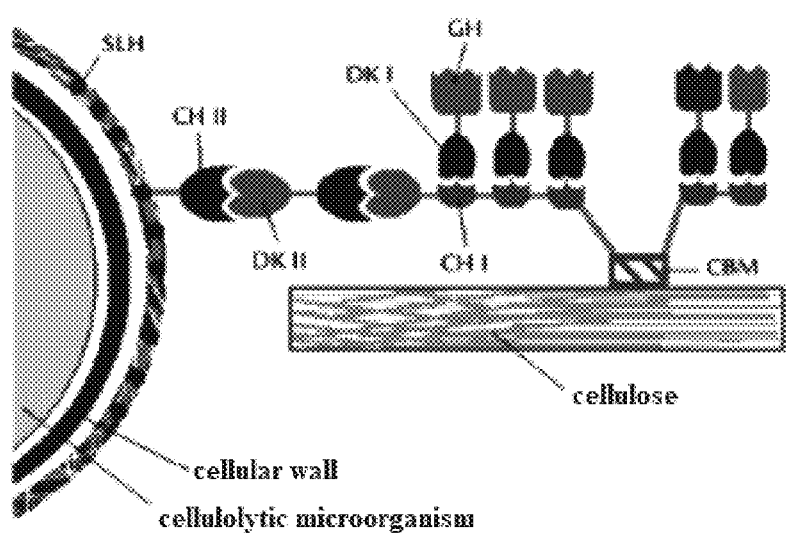
FIG. 1 depicts the structure of the cellulosome.
Figure 2:
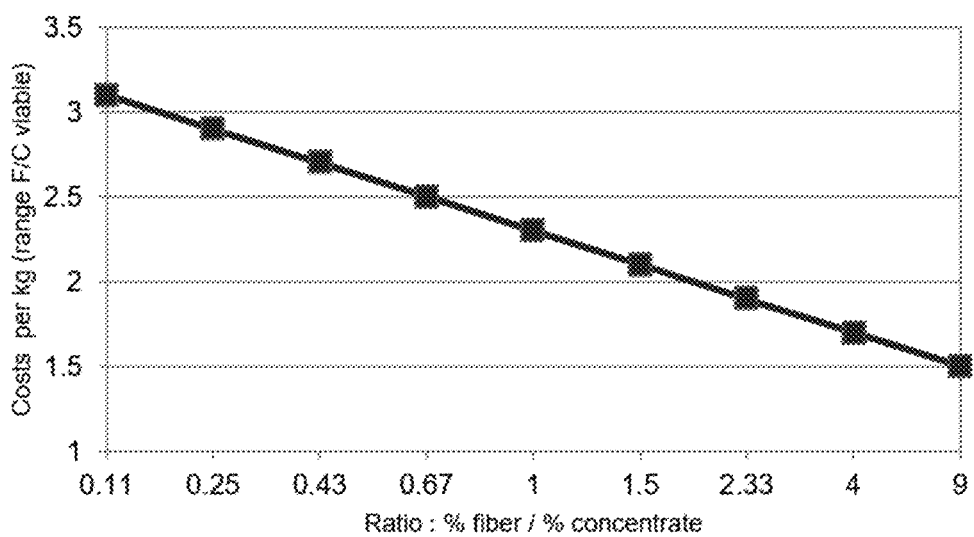
FIG. 2 is a graph of fiber/concentrate ratio (viable range) in diet and cost.

Table 1: Effect of cooperative associativism on the bacterial population.
Table 2: Reduction of methane (CH4) associated with consumption of the additive.
Table 3: Scheme of the procedure for the production of a multiplier and modulator additive of the ruminal microbiota.

DETAILED DESCRIPTION OF THE INVENTION

To better explain the procedure for the production of a multiplier and modulator additive of the ruminal microbiota from exogenous multienzyme compounds, demonstrating its unique and novel characteristics, the following flow diagram and its corresponding constructive Lay-out and working protocols associated for obtaining the product of the present invention are presented. Table 3 is a scheme of the procedure for the production of a multiplier and modulator additive of the ruminal microbiota.

Step 1: Multiplication of the Selected Fungi Bank for the Production of Active Component 1 (A.C. 1)

This is the first step of the technique for obtaining the multiplication of fungal species and inter-species crossings (denominated as F1) that will be responsible for the subsequent enzymatic production. The fungi species selected to validate the implementation of the procedure described in this patent, preferably of fibrolytic nature, with different capacities to degrade cellulose, hemicellulose and lignin, can be obtained from a germplasm bank, according to specifications described in this patent.

Laboratory:

The bank of species to be cultivated separately, is placed in Petri dish culture on Agar-Agar substrate, and placed in an oven at 28° C. until the mycelial expansion has been achieved in a percentage higher than 90% coverage of the Petri dish.

The micellar structure of the Petri dish is removed to transfer it to multiplication trays in the culture rooms.

Cultivation Rooms:

So many culture rooms are required as the amount of fungal species that are used for the production of the multiplier and modulator additive object of the present invention.

In order to illustrate the combinations of species that can be used, the flow diagram shows the fungal species (see list of Fungal Species in step 4) used as reference for the implementation of the procedure described in the present specification.

The cultivation rooms are designed in a dimension of 4 m wide by 4 m long and a maximum height of 3 m, with an anti-slip porcelain floor and Durlock plastic-coated walls with controlled opening and closing ventilation systems.

These rooms are equipped with opening and closing devices controlled by a computer that regulates ventilation according to the reading levels that are taken by the different environmental sensors that will measure parameters of:

1—Relative Humidity
2—Temperature
3—Oxygen level

4—Levels of ammonia in atmosphere
5—Specific wavelength for each room
6—pH (levels of acidity or alkalinity)
7—Type of substrate The fungal species used to validate the method of preparation of the ruminal microbiota multiplier and modulator additive described in the present invention included 23 fibrolytic species with different capacities to degrade the different types and forms of plant wall structure, where some are more related to the degradation of cellulose, others to hemicellulose, and the same to the compounds related to lignin.

In this stage, the sexual phase is induced in said species. The environmental conditions necessary to achieve it are:

Relative Humidity: must be in the range of 86% to 95% of RH. This condition is achieved with the automatic sprinkling. The sprinklers work with conical spouts of ultrafine droplets of water with a pressure of 4.5 kg.

Temperature: values between 23 to 28° C.

Oxygen level: The concentration must be between 10 to 15% O2, displaced by ammoniacal nitrogen typical of saturated atmospheres of low ventilation induced for this stage.

Light (wavelength): ultraviolet electromagnetic radiation at a wavelength of 400-410 nm. Its function is to induce the growth of the sexual phases of all the fungal species that are reproduced in each of the rooms.

pH: the optimum level for its growth and development is an acid medium with a pH of 4.5 to 5.3.

Substrate: The substrate is prepared on sterile plastic trays of a size of 30 cm by 40 cm with a height of 8 cm.

The composition of said substrate is a mixture of:
10% Peat
10% Organic Compost composed in turn with 30% organic matter
15% yeasts with a minimum of 90% live population
15% Common white sugar
30% lignocellulosic biomass. For example, a mixture of cotton husk and peanut box shell
5% of the fungal species corresponding to each multiplying room (according to flow chart indicated)
5% urea
10% Dolomitic Calcium Carbonate As depicted on FIG. 3 these ingredients are mixed in order to then fill the trays with the mixture, which are placed on the shelves from the floor to the ceiling of the room, and are flooded with water to start the growth of the selected fungal species.

This procedure is performed behind closed doors of the corresponding rooms for 10 days, observing growth and development of species. At the end of this period, growths of the corresponding fungi ("hat" type) will be obtained in the culture trays and micellar remains at the foot of the fungal structures, which will be harvested according to specifications described in step 1, which is summarized as:

Collection and harvesting of mycelium and enzymatic base/collection and harvesting of fungal species and interspecies hybrids that will be combined to produce Active Component 1 (A.C. 1).

Before harvesting the spores and fruiting bodies of the species in each room, the mycelia located at the foot of the fungal reproductive structures are harvested with surgical steel comb; Said mycelia will be subsequently preserved in Petri dishes, as described in the protocol for initiation of fungal multiplication (Step 1, Laboratory).

Said myceliar structure produces an enzymatic content (considered as "Base") associated with the set of fungal species selected, and which is incorporated as part of the Active Component 1 (A.C. 1) within the formulation process of the multiplier and modulator additive of ruminal microbiota object of the present invention.

Step 2: Harvest-Dormancy-Storage of Fungal Cultures

Is the implementation of harvesting operations and conservation of fungal reproductive structures that will be used as supplies to develop the next step, using processes and devices that ensure the combination of enzymatic properties associated with the different species of fungi selected for their integration into the A.C. 1.

Storage and Inoculant Bank

This set of operations ensures the storage of the fungal inoculant bank that was produced under conditions compatible with the next step of the production procedure of the multiplier and modulator additive of the ruminal microbiota.

On the same trays treated for the mycelial and enzymatic base harvest, the harvest of fungal spores and conidial remains is done, with the utmost care to isolate them as much as possible from the substrate floor or base of each tray.

For this purpose, thin silk blankets are placed on the surface of the substrate and in this way the fungal spores isolated in Petri dishes are collected for the "Storage and Inoculant Bank" stage. These Petri dishes will also serve as supply for the next Step 2 (corresponding to the asexual cultivation and propagation of the species and inter-species hybrids that were multiplied in Step 1), and will integrate the base raw material of Active Component 1 (A.C. 1) within the process for the production of the multiplier and modulator additive object of the present invention.

These petri dishes, perfectly identified according to their origin from each room corresponding to a species or an inter-species hybrid or combination, contain a preparation of xerophytic type with a dolomitic calcareous base and a zinc aluminosilicate, in order to induce the interruption of the growth of the fungus.

The conditions required for this stage of interruption of growth are:

Relative Humidity: ranges from 9% to 11% RH, which is maintained with the adsorbent base of dolomitic calcareous.

pH: values between 6.5 to 7.5 are those indicated to control the growth and development of fungi.

Temperature: between 10-15° C. values.

Light: regular white, permanent.

Oxygen: supersaturated oxygen atmosphere, obtained by forced ventilation.

Step 3: Cultivation of Species and Inter-Species Crosses (F1) of Previously Selected and Multiplied Fungi (Step 1), to Harvest Enriched Biomass of Exogenous Multienzyme Compounds Is the implementation of operations designed to achieve the combination of biomass of the selected species for the production of the multiplier and modulator additive of the ruminal microbiota from exogenous enzymatic compounds, using processes and devices that ensure a combination of the associated enzymatic properties with the different species of fungi that are integrated in the A.C. 1.

In order to achieve this, in a battery of five rooms exactly designed as those used in Step 1, groups of 5 species are isolated and cultivated, in batches of monthly production that correspond to the combination of the number of species involved (for example, 4 batches of monthly production to combine 20 species).

Having observed an improvement in the increase of saccharification of lignocellulosic compounds as a result of the use of interspecific populations, to enhance an improvement in the process it is necessary to have two isolated rooms for the fungal culture derived from inter-species crossings included within from step 1 (in particular *Trichoderma longibrachiatum* x *T. reesei*, *Trichoderma longibrachiatum* x *T. viridae*, and *Trichoderma reseei* x *Trichoderma viridae*), as part of the management procedure of the selected fungi bank for obtaining Active Component 1.

In this step of the procedure, the environmental conditions must be controlled according to the defined requirements to induce the asexual phase of the fungal cultures, starting from the state reached in the previous step, in order to stimulate the expression of the enzymatic activity in the corresponding forms (anamorphic varieties) of the fungal species selected to integrate the A.C. 1 used for the formulation of the multiplier and modulator additive of the ruminal microbiota that is the object of the present invention.

The environmental conditions required to carry out this step are the following:

Relative Humidity: high humidity saturation by sprinkling water drop in the form of mist that gives the place and ideal medium to be in a range of 89-98% RH.

pH: acid. pH levels in the range 3.5-4.8 are indicated.

Temperature: between 28-31° C.

Light: 589 nm sodium yellow.

Oxygen: normal atmosphere.

Substrate for making the trays used in STEP 3:

The substrate is prepared on sterile plastic trays of a size of 30 cm×40 cm with a height of 8 cm. In said trays the substrate is prepared based on a mixture of:

30% Peat

15% Organic Compost containing 30% organic matter

5% Live yeasts of more than 90% of living population

5% Regular white sugar

10% lignocellulosic biomass. For example, mixture of cotton husk and peanut box shell 5% of the Fungal Species corresponding to each multiplying room 15% Diammonium Phosphate 5% Dolomitic Calcium Carbonate 10% Integral Fine Ground Rice These trays are checked after 15 days, and under the environmental conditions described, the micellar structures and conidial remains that will be part of Active Component 1 (A.C. 1) are harvested. Harvesting is carried out by sweeping with surgical steel comb, and subsequent vacuum packaging.

The most remarkable enzymes that are present in the multiplier and modulator additive of the ruminal microbiota from exogenous multienzyme compounds are:

Endoglucanases, Exo-glucanases (pure culture or crosses), Xylanases, Lacasa, CeloBio-Hydrolases (CBHI, CBHII), Beta-Glucosidases, Hemicellulases, Pectinase.

The micellar structures and conidial remains harvested are stored and subsequently mixed as part of the A.C. 1.

Once the A.C. 1 is produced, to achieve the distinctive characteristics of the multiplier and modulator additive of the present invention and thus achieve a greater degradation efficiency of lignocellulosic compounds, it is necessary to achieve a balance between:

Fibrolytic enzymes (associated with the selected fungal species used)

Conidial remains of the fungal species and inter-species hybrids used

Modulating ingredients that contribute to the microbial nutrition of the rumen and achieve a stoichiometric balance with greater capacity to degrade foods with high fibrous content, to be incorporated as additional supplies in the formulation of the multiplier and modulator additive of the ruminal microbiota.

Step 4: Assembly Active Component 1 (A.C. 1)

The functional contribution of A.C. 1 to the multiplier and modulator additive of the ruminal microbiota is achieved through its activity as initiator of catalytic complexes, cellulosomes, involving fibrous foods and rumen cellulolytic bacteria. In this step the assembly of said component is done by mixing fungal biomass enriched in exogenous multienzyme compounds (from step 3) with the material derived from the mycelial and enzymatic base crop (from step 1) conserved under the conditions indicated in step 2.

In order to achieve the described mixture, it is placed in a stainless steel micro-mixer operated in a closed and clean environment:

25 to 35% Enzymatic complex (from step 1)

60 to 65% Conidial remains (from step 3)

5 to 10% Microcrystalline Cellulose (Excipient Base)

These active ingredients are mixed for 300 seconds, then the mixture is vacuum packed and the containers are heat sealed for later storage.

The fungal biomass (mycelial and enzymatic harvest+conidial residues) enriched in exogenous multienzyme compounds comes from the following species and their possible interspecies hybrid combinations (indicated by an X between the scientific names of the corresponding species), produced using the processes, devices and production conditions described in this Specification:

*Trichoderma longibrachiatum*

*Trichoderma reesei* (=*Hypocrea jecorina*)

*Trichoderma viride* (=*T. harzianum* ó*Hypocrea atroviridis*)

*Trichoderma longibrachiatum* x *T. reesei*

*Trichoderma longibrachiatum* x *T. viridae*

*Trichoderma reseei* x *Trichoderma viridae*

*Trichoderma hirsuta*

*Phanerochaete chrysosporium*

*Chrysosporium lucknowense*

*Agaricus bisporus*

*Aspergillus terreus*

*Aspergillus oryzae*

*Aspergillus niger*

*Aspergillus flavus*

*Schizosaccharomyces pombe*

*Pyricularia oryzae*

*Pycnoporus cinnabarinus*

*Pleurotus ostreatus*

*Pleurotus eryngii*

*Thanatephorus cucumeris*

*Phlebia radiata*

*Pycnoporus sanguineus*

*Stropharia coronilla*

Step 5: Assemble Active Component 2 (A.C. 2)

For the purposes of this step, it is considered as modulators (or "stequio-regulators of the ruminal microbiota") a certain amount of natural, organic and inorganic products that aim to achieve a functional balance of the microbial population of the rumen associated with the entry of the exogenous multi-enzymatic compounds included in the formulation of the multiplier and modulator additive described in the present invention.

The assembly of modulators of the rumen microbiota (by mixing their supplies in the defined proportions) facilitates their subsequent combination with the active component 1, being a fundamental step in the process of integration of processes and devices designed to grow and harvest biomass from selected fungal species, according to the specifications to produce a multiplier and modulator additive of ruminal microbiota with industrial application in feeding systems for ruminant animals.

This procedure is considered particularly dynamic, since it can be used to achieve different combinations of the enzymatic properties associated with the selected fungal species, and because it is feasible to be incorporated into multiple feed systems of ruminant animals, either directly as food or as a supplement nutrition to be delivered through existing devices or to be developed with said purpose, and with positive economic and environmental impact on livestock production systems.

The components identified as modulators of the ruminal microbiota are mixed (in a stainless steel micro-mixer operated in a closed and clean environment) to form the A.C. 2, in the following proportions:

Ingredients of Active Component 2 (A.C. 2)

| Ingredient | Proportion |
| --- | --- |
| Corn Starch | 10% |
| Common Sugar | 5% |
| Residue of the substrate used for the cultivation of yeasts | 3% |
| Milled Burgol Wheat | 5% |
| Fine milled rice | 3% |
| Microcrystalline Cellulose | 15% |
| Dolomite qs | 8% |
| Vermiculite qs | 7% |
| Residue from yeast culture (dead) | 12% |
| Yeast culture (live protected) | 8% |
| Glucans Mannans Oligo-Fructosans (M.O.S.) | 2% |
| Phytase | 1% |
| Isoleucine | 0.5% |
| Lysine | 0.3% |
| Leucine | 0.3% |
| Methionine | 0.4% |
| Threonine | 0.7% |
| Tryptophan | 0.7% |
| Choline Chloride | 0.7% |
| Organic Selenium | 0.1% |
| Sucrose | 16% |
| Vitamin E | 1% |
| Carbonate Calcium qs | 0.3% |

This mixture of ingredients (A.C. 2) should be combined with A.C. 1, in defined proportions, as described in step 6.

Step 6: Protocol for the Formulation of the Multiplier and Modulator Additive of the Ruminal Microbiota This step corresponds to the mixture (with periods of 300 seconds) of the multienzyme component (A.C. 1) and the modulating component (A.C. 2), in order to achieve the different proportions of the multiplier and modulator additive according to the particular conditions of distribution of the product as supplement for feeding ruminant animals, where said mix A.C. 1+A.C. 2 is carried out in a mixer of 50 kg capacity.

The mixing ratio recommended for the formulation of the multiplier and modulator additive of the ruminal microbiota intended for direct use in food preparation for livestock production systems is: 15% to 20% of A.C. 1, and 75% to 80% of A.C. 2. In the interval corresponding to these proportions the improvements in digestibility of the consumed fibrous food were determined, and the reductions of feeding costs were reported (by greater utilization of the consumed fibrous food), also associated with a significant reduction in the energy loss associated with ruminal methane release.

The assembly of the components A.C. 1 and A. C. 2 was detailed in the corresponding sections (step 4: A.C. 1 and step 5: A.C. 2), and its mixing, in the proportions defined in this step 6 for the formulation of the multiplier and modulator additive, is considered as an integral part of the procedure object of this patent.

The functional evaluations carried out included the use of different routes for the distribution and use of said formulation, appropriate to each feed system for ruminant animals, including the following:

a) Mineral vitamin pre-mixtures (both in the form of powdered Salts and Solid Blocks) and finished feeds (TMR) intended for the feeding of ruminants, when the proportion of said additive is between 10% and 20% of the total of the pre-mix.

b) Devices used for the distribution of supplements for the nutrition of ruminants fed under confined, semi-confined conditions or extensive farmland systems, such as tablets (obtained by means of a granulator, with a range between 8-18 mm in diameter) formed by a fibrous lignocellulosic matrix, containing 1% of the additive, and capable of being administered through an intra-ruminal applicator that allows the slow release of the components included in the formulation of the additive object of the present invention, for applications requiring a period of effectiveness greater than 90 days.

One embodiment is a method of preparing a first active component in an additive for ruminal microbiota, the method comprising the steps of:

(a) multiplying a bank of fungal species to produce an enzymatic complex comprising (i) mycelial structures and (ii) spores and fruiting bodies; wherein the bank of fungal species is two or more of the following:

Trichoderma longibrachiatum; Trichoderma reesei (=Hypocrea jecorina); Trichoderma viride (=T. harzianum ó Hypocrea atroviridis); Trichoderma hirsuta; Phanerochaete chrysosporium; Chrysosporium lucknowense; Agaricus bisporus; Aspergillus terreus; Aspergillus oryzae; Aspergillus niger; Aspergillus flavus; Schizosaccharomyces pombe; Pyricularia oryzae; Pycnoporus cinnabarinus; Pleurotus ostreatus; Pleurotus eryngii; Thanatephorus cucumeris; Phlebia radiata; Pycnoporus sanguineus; Stropharia coronilla;

(b) cultivating interspecies crosses (F1) of certain species of (a), to produce conidial remains, wherein the interspecies crosses (F1) are one or more of the following:

Trichoderma longibrachiatum x T. reesei; Trichoderma longibrachiatum x T. viridae; or Trichoderma reesei x Trichoderma viridae; and (c) mixing the products of (a) and (b) with an excipient base to produce the active component.

Disclosed is an additive for ruminal microbiota, the additive comprising:

(a) a first active component comprising (i) mycelial structures, spores and fruiting bodies from a bank of fungal species, wherein the bank of fungal species includes two or more of the following: *Trichoderma longibrachiatum*; *Trichoderma reesei* (=*Hypocrea jecorina*); *Trichoderma viride* (=*T. harzianum* ó *Hypocrea atroviridis*); *Trichoderma hirsuta*; *Phanerochaete chrysosporium*; *Chrysosporium lucknowense*; *Agaricus bisporus*; *Aspergillus terreus*; *Aspergillus oryzae*; *Aspergillus niger*; *Aspergillus flavus*; *Schizosaccharomyces pombe*; *Pyricularia oryzae*; *Pycnoporus cinnabarinus*; *Pleurotus ostreatus*; *Pleurotus eryngii*; *Thanatephorus cucumeris*; *Phlebia radiata*; *Pycnoporus sanguineus*; *Stropharia coronilla* and (ii) conidial remains of one or more of the following interspecies crosses (F1): *Trichoderma longibrachiatum* x *T. reesei*, *Trichoderma longibrachiatum* x *T. viridae* and *Trichoderma reseei* x *Trichoderma viridae*; and (b) a second active component comprising two or more of the following: corn starch, sugar, wheat, rice, cellulose, dolomite, vermiculite, yeast, glucans mannans oligofructosans (M.O.S.), phytase, isoleucine, lysine, leucine, methionine, threonine, tryptophan, choline chloride, selenium, Vitamin E or calcium carbonate; wherein the reduction in methane produced by a ruminant when ingesting the additive is at least 28% when compared to the methane produced by a ruminant that his not ingested the additive.

The above is a detailed description of particular embodiments of the invention. It is recognized that departures from the disclosed embodiments may be made within the scope of the invention and that obvious modifications will occur to a person skilled in the art. Those of skill in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

TABLE 1

Effect of cooperative associativism on the bacterial population

| Bacterial population (without additive) | Bacterial population (with the multiplier and modulator of ruminal microbiota additive) |
|---|---|
| Natural microbial yield (NMY) on cellulose fraction (cotton bud): 50% of the diet | NMY + additive on cellulose fraction (cotton bud): 50% of the diet |
| Every 100,000 colony forming units (cfu) | Every 100,000 colony forming units (cfu) |
| Digestion rate: 105%/h1 | Digestion rate: 560%/h1 |

TABLE 2

Reduction of methane ($CH_4$) associated with consumption of the additive

| Constant Ko | | FIBER | % concentrated food<br>% fibrous food | WITHOUT ADDITIVE High Conc.<br>85%<br>15% | WITHOUT ADDITIVE Low Conc.<br>38%<br>62% | WITH ADDITIVE Low Conc.<br>38%<br>62% |
|---|---|---|---|---|---|---|
| 1.52 | x1 | 1 | RDP | 130.0 | 120.0 | 80.0 |
| 3.38 | x2 | −1 | RDF | 60.0 | 80.0 | 10.0 |
| 3.78 | x3 | 1 | RDFI | 140.0 | 90.0 | 63.0 |
| 1.49 | x4 | 1 | FDNE | 1.0 | 5.0 | 2.0 |
| 1.142 | | 1 | | 1.142.0 | 1.142 | 1.142 |
| | VALUE | | Y= | 1860.49 Joules | 1653.65 Joules | 1508.92 Joules |
| | | | 1 Joule= | 0.239005 Cal | | |
| | | | Y= | 444.67 Cal | 395.23 Cal | 360.64 Cal |
| $R^2$ = 0.896 (maximum value explainable by consumption of highly digestible concentrates) | | | $R^2$ (value explaines by consumption)= | 0.63 | 0.45 | 0.32 |
| DIFFERENCE: 85% CONCENTRATED (without additive) vs 38% CONCENTRATED (without additive) | | | | | 29% | |
| DIFFERENCE: 38% CONCENTRATED (without additive) vs 38% CONCENTRATED (with additive) | | | | | | 28% |
| DIFFERENCE: 85% CONCENTRATED (without additive) vs 38% CONCENTRATED (with additive) | | | | | | 49% |

X1 RDP Raw Digestible Protein
X2 RDF Raw Digestible Fat
X3 RDFI Raw Digestible Fiber
X4 FDNE Free Digestible Nitrogen Extract

TABLE 3

Scheme of the procedure for the production of a multiplier and modulator additive of the ruminal microbiota

| Steps | Description | Location | Product |
|---|---|---|---|
| 1 | Multiplication of the selected fungi bank for the production of Active Component 1 (A.C. 1) | Laboratory Cultivation rooms: as many cultivation rooms are required as the number of fungal species that are used | Mycelial structures for multiplication in cultivation rooms. Supplies for assembly of A.C. 1 (spores and fruiting bodies of the species in each room/enzymatic content (considered as "Base") associated with the set of selected fungal species |
| 2 | Harvest-dormancy-storage of fungal crops | Trays treated for the miceliar crop and enzymatic base | Fungal inoculant bench |
| 3 | Cultivation of species and interspecies crossings (F1) of previously selected and multiplied fungi (step 1) | Cultivation rooms: five rooms designed like those used in Step 1, to grow selected species two isolated rooms to cultivate the inter-species crossings included in step 1 | Supplies for assembly of A.C. 1 (fungal biomass enriched with exogenous multienzyme compounds) |
| 4 | Active component 1 assembly (A.C. 1) | stainless steel micro-mixer operated in a closed and clean environment | Active Component 1 (A.C. 1) |
| 5 | Active component 2 assembly (A.C. 2) | stainless steel micro-mixer operated in a closed and clean environment | Active Component 2 (A.C. 2) |
| 6 | Protocol for the formulation of the multiplier and modulator additive of the ruminal microbiota | 50 kgs capacity mixer | Multiplier and modulator additive of the ruminal microbiota, obtained by the production process object of this patent. |

I claim:

1. An additive for ruminal microbiota, the additive comprising:
    (a) a first active component comprising (i) mycelial structures, spores and fruiting bodies from a bank of fungal species, wherein the bank of fungal species includes two or more of the following: *Trichoderma longibrachiatum; Trichoderma reesei; Trichoderma viride; Trichoderma hirsute; Phanerochaete chrysosporium; Chrysosporium lucknowense; Agaricus bisporus; Aspergillus terreus; Aspergillus oryzae; Aspergillus niger; Aspergillus flavus; Schizosaccharomyces pombe; Pyricularia oryzae; Pycnoporus cinnabarinus; Pleurotus ostreatus; Pleurotus eryngii; Thanatephorus cucumeris; Phlebia radiata; Pycnoporus sanguineus; Stropharia coronilla* and (ii) conidial remains of one or more of the following interspecies crosses: *T. longibrachiatum* x *T. reesei, Trichoderma longibrachiatum* x *T. viride* or *T. reesei* x *Trichoderma viride*; and
    (b) a second active component comprising two or more of the following: corn starch, sugar, wheat, rice, cellulose, dolomite, vermiculite, yeast, glucans mannans oligofructosans (M.O.S.), phytase, isoleucine, lysine, leucine, methionine, threonine, tryptophan, choline chloride, selenium, Vitamin E or calcium carbonate.

2. A method of preparing a first active component in an additive for ruminal microbiota of claim 1, the method comprising the steps of:
    (a) multiplying a bank of fungal species to produce an enzymatic complex comprising (i) mycelial structures and (ii) spores and fruiting bodies; wherein the bank of fungal species is two or more of the following:
    *Trichoderma longibrachiatum*
    *Trichoderma reesei*
    *Trichoderma viride*
    *Trichoderma hirsuta*
    *Phanerochaete chrysosporium*
    *Chrysosporium lucknowense*
    *Agaricus bisporus*
    *Aspergillus terreus*
    *Aspergillus oryzae*
    *Aspergillus niger*
    *Aspergillus flavus*
    *Schizosaccharomyces pombe*
    *Pyricularia oryzae*
    *Pycnoporus cinnabarinus*
    *Pleurotus ostreatus*
    *Pleurotus eryngii*
    *Thanatephorus cucumeris*
    *Phlebia radiata*

*Pycnoporus sanguineus*
*Stropharia coronilla;*

(b) cultivating interspecies crosses of certain species of (a), to produce conidial remains, wherein the interspecies crosses are one or more of the following:

*T. longibrachiatum* x *T. reesei;*
*T. longibrachiatum* x *T. viride;* or
*T. reseei* x *Trichoderma viride;* and (c) mixing the products of (a) and (b) with an excipient base to produce the active component.

3. The method of claim 2, wherein the resultant mixture of step (c) comprises: 25 to 35% of the enzymatic complex; 60 to 65% of the conidial remains, and 5 to 10% of the excipient base.

4. A method of preparing an additive of claim 1, comprising combining 15 to 20% of the first active component with 75 to 80% of the second active component to produce the additive.

5. A ruminant feed formulation comprising the additive of claim 1, wherein the reduction in methane produced by the ruminal microbiota of a ruminant when ingesting the additive is at least 28% when compared to the methane produced by the ruminal microbiota of a ruminant that has not ingested the additive.

6. The ruminant feed formulation of claim 5, wherein the reduction in methane produced by the ruminal microbiota of a ruminant when ingesting the additive is at least 49% when compared to the methane produced by the ruminal microbiota of a ruminant that has not ingested the additive.

7. The ruminant feed formulation of claim 5, further comprising salt.

8. The ruminant feed formulation of claim 5, wherein the additive comprises 10 to 20% of the formulation.

9. The ruminant feed formulation of claim 5, wherein the additive is incorporated into a tablet comprising a fibrous lignocellulosic matrix.

10. The ruminant feed formulation of claim 5, in the form of an extended release formulation that is capable of releasing the additive over a period of at least 90 days.

* * * * *